United States Patent [19]
Watanabe et al.

[11] Patent Number: 6,013,374
[45] Date of Patent: Jan. 11, 2000

[54] BATTERY PARTS

[75] Inventors: Akira Watanabe, Yokohama; Isao Kaneko, Joetsu; Atsushi Kasai, Ibaraki-ken; Kunio Bizen, Sakaide, all of Japan

[73] Assignee: Mitsubishi Chemical Corporation, Japan

[21] Appl. No.: 09/006,381

[22] Filed: Jan. 13, 1998

[30] Foreign Application Priority Data

Jan. 14, 1997 [JP] Japan ................................ 9-004559

[51] Int. Cl.[7] .......................... B32B 27/08; B32B 27/32; B32B 27/40; B32B 33/00; H01M 2/02
[52] U.S. Cl. ........................ 428/424.8; 428/423.1; 428/420; 428/421; 428/516; 428/517; 428/523; 428/36.8; 428/35.7; 523/134; 429/163; 429/175; 429/176; 429/254; 156/242; 156/295; 156/313; 156/331.4; 156/333
[58] Field of Search .................... 428/424.8, 423.1, 428/420, 421, 516, 517, 36.8, 35.7; 523/134; 429/163, 175, 176, 254; 156/242, 295, 313, 331.4, 333

[56] References Cited

U.S. PATENT DOCUMENTS

| | | | |
|---|---|---|---|
| 4,076,916 | 2/1978 | Lagow | 526/43 |
| 4,404,256 | 9/1983 | Anand et al. | 428/409 |
| 5,100,723 | 3/1992 | Iwasaki et al. | 428/265 |
| 5,486,570 | 1/1996 | St. Clair | 525/123 |
| 5,646,229 | 7/1997 | Kudo | 528/53 |
| 5,665,488 | 9/1997 | Young et al. | 428/143 |
| 5,792,528 | 8/1998 | Carstens et al. | 428/36.1 |
| 5,900,321 | 5/1999 | Carstens et al. | 428/457 |

*Primary Examiner*—Mark L. Warzel
*Attorney, Agent, or Firm*—Nixon & Vanderhye

[57] ABSTRACT

The present invention relates to battery parts comprising molded pieces made of polyolefin resin, whose surface to be bonded are treated so as to have at least one functional group selected from the group consisting of hydroxyl group, carboxyl group, carbonyl group, fluorosulfuryl group, sulfonic group and its metallic bases, said molded pieces being bonded together with reactive hot-melt adhesive.

21 Claims, 2 Drawing Sheets

BATTERY PARTS

BACKGROUND OF THE INVENTION

The present invention relates to battery parts made of polyolefin resin. More particularly, the present invention relates to battery parts comprising polyolefin resin moldings bonded together, with an adhesive processing and a process thereof. The parts produced according to the present invention is particularly useful for lithium batteries.

Since polyolefin resins are excellent in heat and chemical resistance, the polyolefin resins have been widely utilized for preservation containers of chemical and medicinal substances, etc., and have recently been used for the containers of various types of battery such as lithium batteries, alkaline batteries and lead batteries.

In manufacturing battery parts by bonding the polyolefin resin moldings, since there is no functional group in the resin constituting the surface to be bonded of the polyolefin resin moldings, it is required to (1) fusion-bond the moldings or (2) bond them with adhesive after surface treatment with plasma, chromic acid or a primer.

The fusion-bonding, however, has some serious disadvantages such as poor dimensional precision of the produced container, need of use of high temperature for bonding work, and great difficulties in conducting high-temperature fusion-bonding of the moldings such as cover of a battery containing an organic solvent-type electrolysis solution.

On the other hand, in case of plasma surface treatment, since a high-vacuum apparatus is required and in case of the surface treatment with a chemical substance such as chromic acid, there are problems of treatment of a strong acid and disposal of the waste chemicals. Also, in case of the surface treatment using a primer, there is a problem of desiccation since the primer itself is a solvent.

Further, when the surface-treated moldings are bonded together with an epoxy or acrylic adhesive, the bonded portions may be affected and reduced in bonding strength by the acid electrolysis solution in the case of lead batteries, by the alkaline electrolysis solution in the case of alkaline batteries, and by the electrolysis solution comprising organic solvents, in the case of lithium and other similar types of batteries. Also, since those adhesives are hard, the bonded portions, when being subject to an external force such as vibrations, may be cracked to cause leakage of the electrolysis solution. Particularly in the case of lithium batteries which need to be strictly protected against moisture, degradation of the bonded portions is fatal.

Injection molding is conducted for manufacturing polyolefin resin-made battery containers, but this method has difficulties in working of complicate configurations and also involves problems on cost and environmental protection.

As a result of the present inventors' earnest studies to solve the above problems, it has been found that by using a reactive hot-melt adhesive after conducting surface treatment of the moldings with a mixture comprising fluorine-containing gas, preferably a mixture comprising fluorine gas and oxygen gas or a mixture comprising fluorine gas, sulfur dioxide gas and oxygen gas, it is possible to bond the polyolefin resin moldings to each other strongly with high dimensional precision. The present invention has been attained on the basis of the above finding.

SUMMARY OF THE INVENTION

An object of the present invention is to provide battery parts made of polyolefin resin, which are free of the prior art problems mentioned above, and can be used for producing battery container in simply manufacturing process and at low cost by bonding the polyolefin resin moldings together, so that the bonded portions are not degraded by the acid electrolysis solution, alkaline electrolysis solution or electrolysis solution comprising organic solvent used in the batteries.

To accomplish the above aim, in a first aspect of the present invention, there is provided battery parts comprising molded pieces made of polyolefin resin, whose surface is treated so as to have at least one functional group selected from the group consisting of hydroxyl group, carboxyl group, carbonyl group, fluorosulfuryl group, sulfonic group and its metallic bases, the said molded pieces being bonded together with reactive hot-melt adhesive.

In a second aspect of the present invention, there is provided battery parts comprising molded pieces made of polyolefin resin whose bonding surface are treated with gas containing fluorine gas, said molded pieces being bonded together with reactive hot-melt adhesive.

In a third aspect of the present invention, there is provided a process for producing battery parts comprising molded pieces made of polyolefin resin, which process comprises introducing at least one functional group selected from the group consisting of hydroxyl group, carboxyl group, carbonyl group, fluorosulfuryl group, sulfonic group and its metallic bases into the resin constituting the surface to be bonded, and bonding said molded pieces together, with reactive hot-melt adhesive.

In a fourth aspect of the present invention, there is provided a process for producing battery parts comprising molded pieces made of polyolefin resin, which process comprises treating the bonding surface of said molded pieces with gas containing fluorine gas and bonding said molded pieces together with reactive hot-melt adhesive.

DETAILED DESCRIPTION OF THE INVENTION

Figure 1:
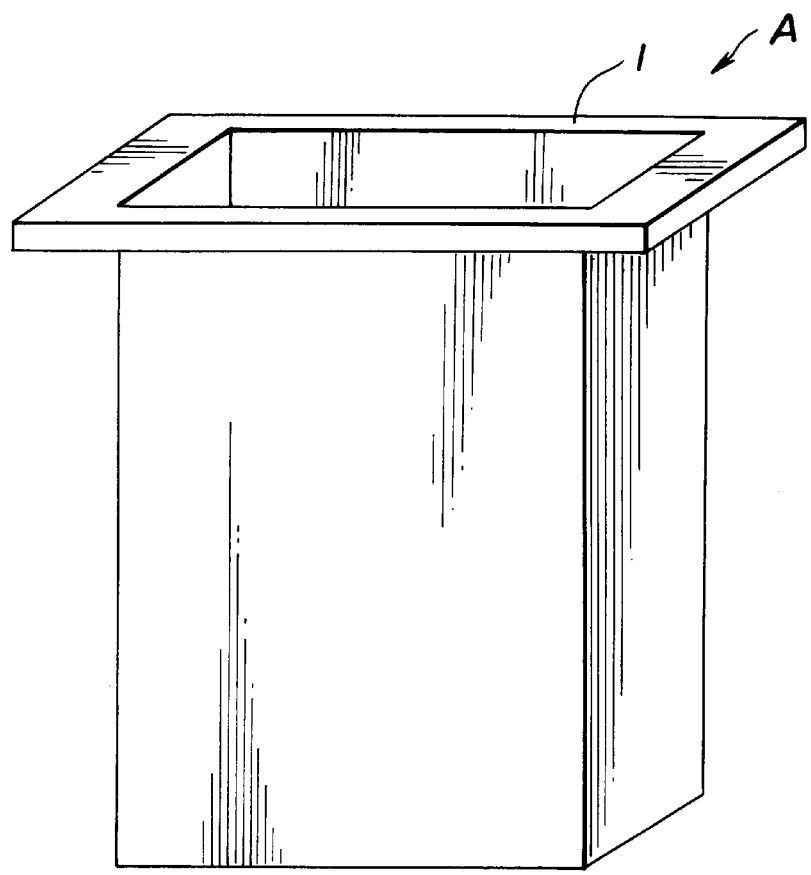
FIG. 1 is a perspective view of a container made by injection molding a polypropylene resin used for battery parts according to the present invention.

The present invention is explained more detail below.

The polyolefin resins usable in the present invention include polyethylene, polypropylene, blends thereof or copolymers of these resins and fluorine resins such as polytetrafluoroethylene are also usable. Polypropylene resin is preferably used because of its advantageous features such as excellent injection moldability, high dimensional precision of its moldings, and short molding time.

As the polyolefin resin moldings usable in the present invention, it is not specified and is possible to use all types of resin moldings made of polyolefin resin as far as capable of forming the desired battery parts. The resin moldings are properly selected according to the purpose of use thereof. Typical examples of such resin moldings suited for use in the present invention are single-layered sheets or films of polyolefins, multilayered sheets or films such as polyethylene/nylon/polypropylene, injection moldings and the like.

The battery parts according to the present invention comprise the above-mentioned polyolefin resin moldings bonded together. The structure of the battery parts are not restricted as far as they can contain electrolysis solution and electrodes, and known structures can be used. As an example for the structure, there is explained a lithium battery later on.

The process for producing the battery parts according to the third aspect of the present invention is a process for producing battery parts comprising molded pieces made of the above-mentioned polyolefin resin, which process comprises introducing at least one functional group selected from the group consisting of hydroxyl group, carboxyl group, carbonyl group, fluorosulfuryl group, sulfonic group and its metallic bases into the resin constituting the surface to be bonded, and bonding the said molded pieces together with reactive hot-melt adhesive. Further, in the first aspect of the present invention, there is provided battery parts comprising molded pieces made of the above-mentioned polyolefin resin, whose resin constituting the surface to be bonded has at least one functional group selected from the group consisting of hydroxyl group, carboxyl group, carbonyl group, fluorosulfuryl group, sulfonic group and its metallic bases, said molded pieces being bonded together with reactive hot-melt adhesive.

In the present invention, it is preferred that at least the said functional group is hydroxyl group, carboxyl group or carbonyl group. The introduction process of the said functional group is not restricted, but a surface treatment with gas containing fluorine gas explained below, is preferably used.

The process for producing the battery parts according to the fourth aspect of the present invention is a process for producing battery parts comprising molded pieces made of the above-mentioned polyolefin resin, which process comprises treating the surface to be bonded of the said molded pieces with gas containing fluorine gas and bonding said molded pieces together with reactive hot-melt adhesive. Further, the battery parts according to second aspect of the present invention is battery parts comprising molded pieces made of polyolefin resin whose surface to be bonded are treated with gas containing fluorine gas, the said molded pieces being bonded together with reactive hot-melt adhesive.

The gas containing fluorine gas used for the surface treatment in the present invention is preferably a mixture comprising fluorine gas and oxygen gas. In this case, the ratio of oxygen gas to fluorine gas is usually 0.01–1,000:1, preferably 0.1–100:1 in terms of partial pressure. By the treatment with the mixture comprising fluorine gas and oxygen gas, at least one kind functional group selected from the group consisting of hydroxyl group, carboxyl group and carbonyl group can be introduced into the resin constituting the surface to be bonded of moldings.

Further, the gas containing fluorine gas used for the surface treatment in the present invention is also preferably a mixture comprising fluorine gas and sulfur dioxide gas (treatment (1)). In the mixture comprising fluorine gas and sulfur dioxide gas, fluorine gas is preferably 0.01 to 30 vol %, sulfur dioxide gas is preferably 0.1 to 90 vol %, and oxygen gas is preferably 0 to 95 vol %. Further, fluorine gas is preferably 0.1 to 10 vol %, sulfur dioxide gas is preferably 0.1 to 50 vol %, and oxygen gas is preferably 40 to 90 vol %. By the treatment with the mixture comprising fluorine gas, sulfur dioxide gas and optionally oxygen gas, at least one kind above-mentioned functional groups and fluorosulfuryl group can be introduced into the resin constituting the surface of moldings.

After the treatment (1), when the treated moldings are immersed in an aqueous alkaline solution containing an alkaline metal or an alkaline earth metal (treatment (2)), a metallic base is introduced to sulfonic group introduced into the resin constituting the molding surface. Further, after treatment (2), when the treated moldings are immersed in sulfuric acid (treatment (3)), a sulfonic group is introduced into the resin constituting the molding surface.

By conducting the above treatments (2) and (3), further improvement of adherence to the polyolefin-based reactive hot-melt adhesive having isocyanate groups at the end of polymer chain is achieved.

The alkali compounds usable for the said alkaline solution include hydroxides of alkaline metals or alkaline earth metals such as sodium hydroxide, potassium hydroxide, lithium hydroxide, calcium hydroxide and barium hydroxide, and carbonates such as sodium carbonate, potassium carbonate and lithium carbonate. Alkaline metal hydroxides are preferred.

The mixed gas may be diluted with an inert gas such as nitrogen or helium. The temperature used for treating the surface of the polyolefin resin moldings with the said mixed gas is usually −70 to 90° C., preferably 0 to 50° C. The contacting time of the mixed gas with the moldings can be properly selected from a wide range, but it is usually in the range from one second to 3 hours, preferably one second to one hour. The total pressure for the surface treatment may be either atmospheric pressure, a reduced pressure or an over-atmospheric pressure.

The said treatment of the gas containing fluorine, that is, the contact of the gas containing fluorine gas with the polyolefin resin moldings, can be accomplished by a method in which the polyolefin resin moldings are contained in a closed reaction vessel or in a reaction vessel sealed to inhibit gas leakage, and the atmosphere in the vessel is replaced with the gas containing fluorine gas so as to contact the said treating gas with the polyolefin resin moldings. In this operation, in order to enhance the efficiency of contact with the gas, the polyolefin resin moldings may be fixed so as to not contact each other. In case where the moldings are rolled sheets, they may be passed through the vessel filled with the gas containing fluorine gas, or may be unrolled or taken up in the vessel.

As a reactive hot-melt adhesive usable in the present invention, it is possible to use any type of reactive hot-melt adhesive which are not be affected by the electrolysis solution and shows sufficient adhesiveness. There is preferably used a reactive hot-melt adhesive with strong adhesive force and showing high flexibility in the bonded state to keep the bonded portions from being damaged even when being subject to a thermal or mechanical impact. For providing such flexibility to the reactive adhesive, it is preferred to synthesize the adhesive by using a compound having a flexible moiety such as long carbon chain or polymethylene chain. It is especially preferred to use as principal material a compound having chemically inert long carbon chain, preferably polymethylene chain having alkyl groups on the sides. For example, it is preferred to use as a mainly reactive component a reactive hot-melt adhesive comprising a prepolymer obtained by reacting a compound (a) in which the reactive groups are separated by carbon chains having 12 or more carbon atoms on the average with a compound (b) reactable therewith, the preferable percentage of the compound (a) being 50 to 95 wt % based on the weight of the whole adhesive composition. A reactive adhesive is prepared by using such a prepolymer as base of the reactive moiety.

A preferred example of such reactive hot-melt adhesive is the one in which the isocyanate groups with high reactivity take part in the curing reaction. This type of adhesive is known in the art and can be synthesized by reacting a compound having active hydrogens such as polyol, hydroxycarboxylic acid, polycarboxylic acid or polyamine with a polyisocyanate compound such as diphenylmethane diisocyanate in such a manner that the isocyanate groups remain.

As the compound having active hydrogens, it is preferred to use those commercially available as polybutadiene, polyisoprene or liquid rubbers having functional groups, and their hydrogen adducts. The said compounds having active hydrogens have a number-average molecular weight in the range of usually $5 \times 10^2$ to $2 \times 10^4$, preferably $1 \times 10^3$ to $4 \times 10^3$, and have a polyolefin skeleton and the functional groups having active hydrogen bonding to the hydrocarbon skeleton of the polyolefin such as hydroxyl group, carboxyl group or amino group in a content of usually not more than 3 milliequivalent(meq)/g, preferably 0.01 to 3 (meq)/g.

In case where these compounds have carbon-carbon double bonds subject to the chemical reactions in the skeleton, they are prefer ably used after reducing such double bonds by hydrogenation. The degree of hydrogenation may be properly selected, but usually hydrogenation is conducted until the iodine value becomes usually not more than 100, preferably not more than 20.

A preferred example of other reactive adhesive used in the present invention is as a mainly reactive component an isocyanate-terminated prepolymer obtained by reacting a compound (c) having active hydrogens with an excess amount of polyisocyanate compound (d), the said compound (c) comprising a polymer of conjugate diene monomer such as butadiene or isoprene or a copolymer of the said diene monomer and olefin monomer, the said polymer or copolymer being a polyol and having at least one hydroxyl group in the molecule, and at least part of the double bonds of the said polyol being hydrogenated. Such reactive adhesives include, for example, as mainly reactive component a prepolymer obtained from reaction of hydrogenation products of polybutadiene having hydroxyl groups with a polyisocyanate compound, the said hydrogenation products having a number-average molecular weight of preferably $5 \times 10^2$ to $2 \times 10^4$, an iodine value of preferably not more than 100, more preferably not more than 20 and hydroxyl groups of preferably not less than 1. It is more preferable to use a hydrogenation product of polybutadiene, which is a mixture comprising usually 95 to 20 wt %, preferably 95 to 40 wt % of the moiety in which the average number of hydroxyl groups per one molecule is not less than 1 and less than 2, and usually 5 to 80 wt %, preferably 5 to 60 wt % of the moiety in which the average number of hydroxyl groups per one molecule is not less than 2 and not more than 8.

The preparation method of the said compound having reactive hydrogens is not specified in the present invention. Such polyols may be prepared by polymerizing various types of vinyl monomer or diene monomer by a known polymerization method such as radical polymerization, anionic polymerization, cationic polymerization, etc., and hydroxylate the terminal group thereof, followed, if necessary, by hydrogenation in the known way. It is also possible to conduct a method comprising oxidative decomposition and reduction of an isobutylene-diene monomer copolymer or an olefin (such as ethylene or propylene)-non conjugated diene (or conjugated diene) copolymer.

Examples of the polyisocyanate compounds usable in the present invention include aromatic polyisocyanate compounds such as tolylene diisocyanate, diphenylmethane diisocyanate, their derivatives, phenylene diisocyanate, naphthylene diisocyanate and tolidinediisocyanate; aliphatic polyisocyanate compounds such as hexamethylene diisocyanate, tolymethylhexamethylene diisocyanate, xylylenediisocyanate, tetramethylxylylene diisocyanate, isophorone diisocyanate, dicyclohexylmethane diisocyanate, cyclohexane diisocyanate, lysine diisocyanate and dimeric acid diisocyanate; and trimers of these diisocyanates.

Polyolefin-based reactive hot-melt adhesives can be obtained by reacting the said compound (c) having active hydrogens and polyisocyanate compound (d) under a condition where the isocyanate groups are in excess over the groups containing active hydrogens.

It is required for the reaction of an active hydrogen compound (c) with a polyisocyanate compound to be conducted in such a manner that the content of isocyanate group is more than the content of the group of the active hydrogen. Usually the reaction is conducted such that about 0.1 to 5 wt % of isocyanate groups remain in the prepolymer. When the isocyanate group content in the prepolymer is less than 0.1 wt %, no satisfactory adhesive strength may be provided, and when the said content is more than 5 wt %, the adhesive layer may become frail when cured.

In the preparation of prepolymer, it is possible to add, beside the said compound having active hydrogens, a compound having active hydrogens which has ether linkage or ester linkage in the main chain, such as polyethylene glycol, polypropylene glycol, polycaprolactone-polyol, or an alkylenediol such as ethylene glycol, propylene glycol, butanediol, pentanediol and hexanediol. However, use of an excess amount of such additive compound deprives the said olefin polymer-based compound having active hydrogens of its excellent property in providing an adhesive layer which is chemically inert, flexible and heat resistant, so that the amount of the said additive compound is preferably less than 50 wt % based on the whole amount of the compound having active hydrogens.

Known methods can be used for producing prepolymer. Usually the starting compounds such as mentioned above are reacted in a dry nitrogen gas atmosphere at a temperature between room temperature and 150° C., preferably between room temperature and 120° C., for a period from about 10 minutes to 24 hours. If necessary, a catalyst such as an amine compound may be added for increasing the reaction rate. In case where there is used, as the active hydrogen compound, a combination of a polybutadiene hydrogenation product (e) having 1 to 2 hydroxyl groups on the average per one molecule and another polybutadiene hydrogenation product (f) having 2 to 8 hydroxyl groups per molecule, such as mentioned above, it is preferable that the product (e) is first reacted with the polyisocyanate compound and then the product (f) is added to the resulting reaction product to conduct additional reaction.

The thus produced prepolymer can be used as a reactive adhesive in the form as it is, but usually various other pertinent substances are mixed in the prepolymer to adjust its reactivity and handling properties as well as the properties of the adhesive layer formed. For example, in case where a paraffin wax or a paraffin oil is mixed in the said prepolymer, although its adhesiveness is reduced, the time in which the adhesive can stay effective in the atmosphere (=pot life) is prolonged to improve workability. This is considered attributable to retardation of the reaction between moisture in the atmosphere and isocyanate groups in the prepolymer by mixing of a hydrophobic substance. Mixing of a flexible substance thereof improves flexibility of the adhesive layer.

Since the reactive hot-melt adhesive used in the present invention is one-pack type, its initial adhesive force can be obtained by directly applying the molten adhesive to an adherend and then cooling and solidifying it. Since NCO groups react with moisture and the adhesive is cured without heat-treatment, this adhesive also has good workability. The bonded portion has excellent heat and hydrolytic resistance since the adhesive has a saturated hydrocarbon skeleton.

Then the molding portions treated with the gas containing fluorine gas are bonded together with the said reactive hot-melt adhesive. For this bonding operation, there is preferably used a method in which the reactive hot-melt adhesive is melted by heating and applied to the polyolefin resin surface treated with the said fluorine gas-containing gas, and then the fluorine gas treated portions of the adherends are quickly contacted with each other and press bonded, or a method in which the reactive hot-melt adhesive sheet is sandwiched between the molding portions treated with the said fluorine gas-containing gas, and they are heated and then cooled under pressure to conduct bonding the said portions.

According to the method of the present invention, it is possible to obtain parts for batteries, especially secondary batteries such as electric car battery, back-up battery. As the secondary batteries, there is used lithium battery, lithium ion battery and Ni-MH battery, film battery using solid electrolyte, etc. Bonding may be conducted, for instance, between polyolefin resin-made battery container and polyolefin resin-made cover thereof, between polyolefin-made cover and metallic electrode, etc. In view of adhesiveness, it is particularly preferable to bond the polyolefin resin moldings each other.

An electrolysis solution is contained in the battery to which the battery part of the present invention is applied. As electrolysis solution, the organic electrolysis solution used for lithium ion secondary batteries, aqueous alkaline solutions used for alkaline batteries, aqueous acid solutions used for lead storage batteries, and the like can be used. The battery parts (battery cases) according to the present invention are especially suited for the batteries using an electrolysis solution comprising organic solvent as the electrolysis solution.

Figure 2:
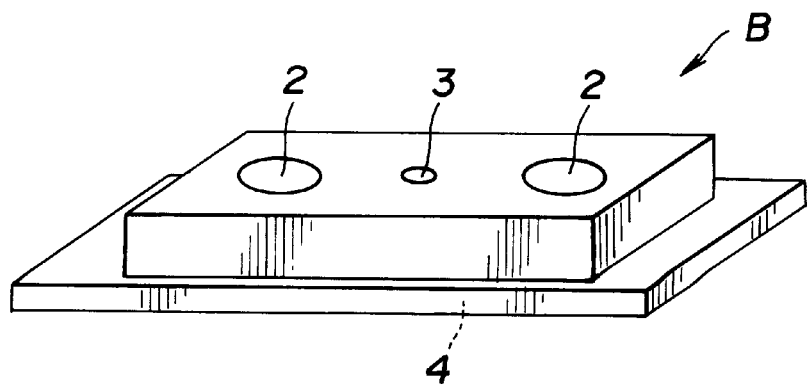
FIG. 2 is a perspective view of the polypropylene resin-made covering of the container shown in FIG. 1.
Figure 3:
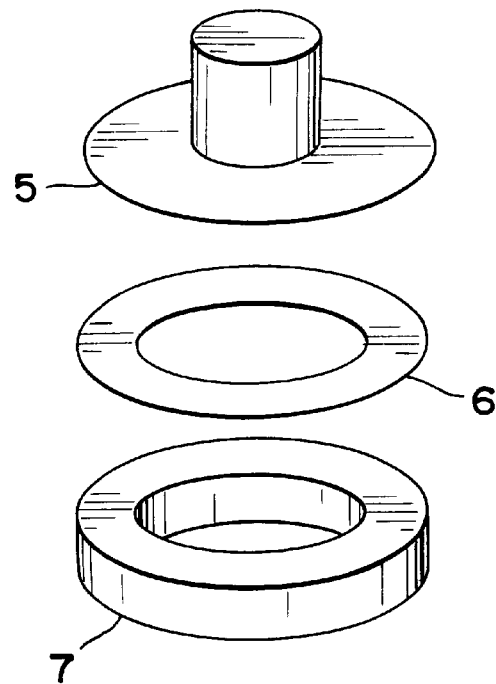
FIG. 3 is partial perspective views of a metallic battery terminal, a polyolefin-made packing and a part of polyolefin-made covering.

In a typical method of producing a lithium ion secondary battery, first a polypropylene resin is injection molded to produce a container (A) such as shown in FIG. 1 and a cover (B) such as shown in FIG. 2. In FIG. 1, the reference numeral 1 denotes a surface for adhesion. In FIG. 2, the reference numeral 2 denotes a hole for setting an electrode, the reference numeral 3 denotes a hole for introducing an electrolysis solution and the reference numeral 4 denotes a surface for adhesion to the surface 1. These container (A), cover (B), a part of polyolefin cover 7 in FIG. 3 and a polyolefin packing 6 in FIG. 3 are set in a reaction vessel which is proof against fluorine gas, and the gas containing fluorine gas is introduced into the vessel to treat the surfaces 1 and 4 of the said container (A), cover (B), part of polyolefin cover 7 and polyolefin packing 6.

Then a positive electrode, a separator and a negative electrode (not shown in the figures) are installed as a laminated structure in the said container (A). Then a polyolefin packing 6 coated with the melted hot-melt adhesive is sandwiched between the electrode terminals 5 and a part of cover 7 and press-bonded as shown in FIG. 3. The part of cover 7 is bonded onto the hole 2 for setting an electrode in the cover (B). The molten hot-melt adhesive is also applied to the portions to be bonded of the cover (B) and the container (A), and the cover (B) is quickly press bonded to join the two securely to each other. After bonding, the electrolysis solution is injected into the container (A) to complete a battery. Strong adhesion with high dimensional accuracy can be obtained by bonding the polypropylene-made cover (B) and container (A), and the electrode metal and cover (B), with the said hot-melt adhesive. Incidentally, a metal electrode comprising the positive electrode and the negative electrode (not shown in the figures) are fixed as a structure of current collector by a welding bar of current collector provided at the inner side of the electrode terminals 5.

According to the present invention, it is possible to provide strong and secure adhesion of polyolefin resin moldings and to obtain the battery parts unaffected by the electrolysis solution by a simple process without requiring any specific apparatus.

EXAMPLES

The present invention is described in further detail with reference to the examples thereof, which examples however are merely intended to be illustrative and not to be construed as limiting the scope of the invention.

In the following Examples, the measurements were made in the following ways.

(1) Tensile Shearing Test

Figure 4:
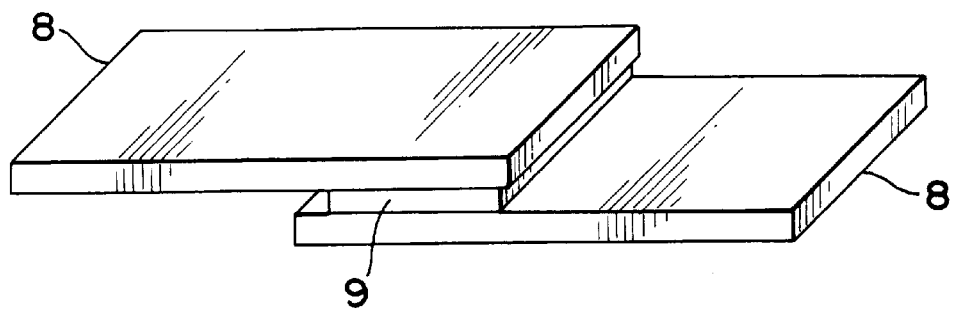
FIG. 4 is a perspective view of tensile shearing test piece.

The tensile shearing test was conducted as follows. A hot-melt adhesive which was cut to a 25 mm square sheet (reference numeral 9 in FIG. 4) and was heated on a hot-plate at a temperature of 120° C., was sandwiched by a pair of test pieces (reference numeral 8 in FIG. 4), and then pressurized and quenched under a pressure of 1.0 kg/cm$^2$, to bond the test pieces. Using an Instron type universal tester, the maximum tensile shearing load and the elongation percentage at the moment of break was measured at the tensile shearing rate of 10 mm/min. The size of the test piece for measurement is 25 mm (width)×100 mm (length)×5 mm (thickness).

(2) Electrolysis Solution-Immersion Test

The electrolysis solution-immersion test was conducted as follows. Propylene carbonate (PC) and diethyl carbonate (DEC) were mixed at a ratio of 1:1, then 1 mole of $LiPF_6$ was dissolved in the mixture (1 liter) to prepare an electrolysis solution, and the test sample was immersed in this electrolysis solution at room temperature. After immersion for 3 weeks, the sample was taken out, washed well with desalted water and then air dried, and the bonded portion of the sample was examined.

(3) Dropping Test for Battery

The surface-treatment and bonding process as described in the following examples are conducted, to prepare a battery whose size is 200 mm (width)×170 mm (depth)×110 mm (height) and whose weight is 5 kg. After the battery is left as it is for 14 days, the battery is dropped at a height of 1.9 m to a concrete floor.

(4) Determination of the Amount of Functional Group

The analysis of the functional group which was present in the resin constituting the surface to be bonded of the polyolefin resin moldings was conducted by an x-ray photoelectron spectroscopy (XPS). Since XPS measurements do not have so high resolving power so as to identify the particular functional groups, the determination of the amount of functional group by XPS measurements were conducted as to three functional groups of —OH, >C=O and —COOH which were labeled by chemical modification, to separate the analysis information of the above-mentioned each functional group. In case of —OH group, >C=O group and —COOH group, the above-mentioned chemical modifications were conducted with trifluoroacetic acid anhydride, pentafluorophenylhydrazine and trifluoroethanol, respectively. The each reaction formula is described as follows.

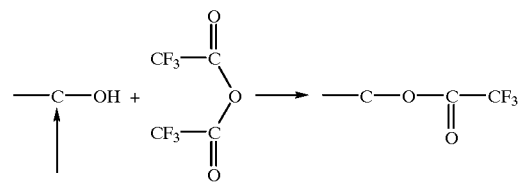

Carbon atom of polyolefin at the surface

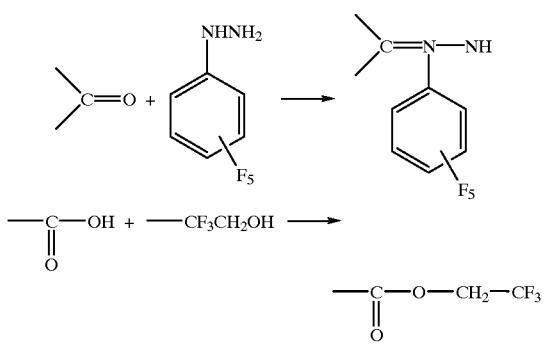

Preparation Example of Polyolefin-Based Reactive Hot-Melt Adhesive 71.7 g of Polytail HA (trade name for a polyolefin-based polyol with hydroxyl equivalent of 0.911 meq/g, active hydrogen equivalent of 0.90 meq/g, number-average molecular weight of 2000, number of hydroxyl group of 1.8, iodine value of 3.1, mfd. by Mitsubishi Chemical Corporation) and 13.1 g of Isonate 125M (trade name for a diphenylmethane diisocyanate mfd. by Mitsubishi Chemical Dow Co. Ltd.) were weighed out and put into a polymerization tube provided with a stirrer, a nitrogen inlet and an evacuating port, and after evacuation of the tube and replacement with nitrogen, the said materials were reacted at 80° C. for 2 hours under nitrogen sealing. Then 15.2 g of Polytail H (trade name for a polyolefin-based polyol with hydroxyl equivalent of 0.861 meq/g, active hydrogen equivalent of 0.82 meq/g, number-average molecular weight of 2800, number of hydroxyl group of 2.3, iodine value of 1.1, mfd. by Mitsubishi Chemical Corporation.) was supplied into the polymerization tube and the reaction was further continued at 80° C. for 3 hours to obtain an adhesive.

This adhesive was sandwiched between a pair of Teflon sheets with a 0.2 m m thick spacer disposed therebetween, and the sheets were pressed at 120° C., thereby making an adhesive sheet.

Example 1

A 130 mm×130 mm×5 mm thick polypropylene sheet was placed in a fluorine gas-proof reactor, and after evacuation of the reactor, a mixed gas consisting of fluorine gas with a partial pressure of 20 Torr, oxygen gas with a partial pressure of 200 Torr and nitrogen gas with a partial pressure of 540 Torr was introduced into the reactor. After 10-minute reaction at 21° C., the mixed gas was discharged out in vacuum, followed by introduction of nitrogen gas into the reactor to return it to 1 atm., and then the treated sample was taken out.

In the analysis of the functional group by XPS measurement, —OH group: 0.04 atm %/carbon atom, >C=O group: 0.15 atm %/carbon atom, —COOH group: 0.02 atm %/carbon atom.

A pair of the thus treated samples was bonded together through the reactive hot-melt adhesive sheet made in the manner described in the above Preparation example by the above-mentioned manner. The obtained bonded test pieces was used for tensile shearing test and electrolysis solution-immersion test. The results are shown in Table 1.

Further, a battery is prepared by using the above obtained samples. The dropping test for the battery is conducted and there is no problem.

Example 2

The same procedure as defined in Example 1 was conducted except for use of a mixed gas consisting of 5.2 vol % of fluorine gas, 47.4 vol % of oxygen gas and 47.4 vol % of nitrogen gas to prepare bonded test pieces.

The tensile shearing test and electrolysis solution-immersion test were conducted. The results are shown in Table 1.

Further, a battery is prepared by using the above obtained samples. The dropping test for the battery is conducted and there is no problem.

Example 3

A polypropylene sheet cut to the same size as in Example 1 is placed in a reactor proof against fluorine gas and sulfur dioxide gas, and after evacuation of the reactor, a mixed gas consisting of 1.0 vol % of fluorine gas, 10.0 vol % of sulfur dioxide gas, 85 vol % of oxygen gas and 4.0 vol % of nitrogen gas is introduced into the reactor to carry out the reaction for 20 minutes at 21° C., after which the mixed gas is discharged out in vacuum, followed by introduction of nitrogen gas into the reactor to restore 1 atm, and then the treated sample is taken out. A pair of the thus treated samples is bonded together through the reactive hot-melt adhesive sheet made in the manner described in the above Preparation example by the above-mentioned manner.

The obtained bonded test pieces are used for tensile shearing test and electrolysis solution-immersion test.

Further, a battery is prepared by using the above obtained samples and the dropping test for the battery case is conducted. The results are estimated as follows. The maximum tensile shearing load is 217 kgf. The elongation percentage at the moment of break is 19%. In the electrolysis solution-immersion test and dropping test for the battery, there is no problem.

Example 4

The sample obtained in Example 3 is immersed in a 1N sodium hydroxide solution at room temperature for one hour, washed with water and dried at 50° C. for one hour. A pair of the thus treated samples is bonded together through the reactive hot-melt adhesive sheet made in the manner described in the above Preparation example by the above-mentioned manner. The obtained bonded test pieces are used for tensile shearing test and electrolysis solution-immersion test.

Further, a battery is prepared by using the above obtained samples and the dropping test for the battery case is conducted. The results are estimated as follows. The maximum tensile shearing load is 231 kgf. The elongation percentage at the moment of break is 20%. In the electrolysis solution-immersion test and dropping test for the battery, there is no problem.

Example 5

A sample subjected to the same treatment as in Example 3 is immersed in a sodium hydroxide solution, then further immersed in 98% concentrated sulfuric acid at 60° C. for one hour, then washed with water and dried at 50° C. for one hour. A pair of the thus treated samples is bonded together through the reactive hot-melt adhesive sheet made in the manner described in the above Preparation example by the above-mentioned manner. The obtained bonded test pieces are used for tensile shearing test and electrolysis solution-immersion test.

Further, a battery is prepared by using the above obtained samples and the dropping test for the battery case is conducted. The results are estimated as follows. The maximum tensile shearing load is 238 kgf. The elongation percentage at the moment of break is 20%. In the electrolysis solution-immersion test and dropping test for the battery, there is no problem.

Comparative Example 1

Bonding was conducted with an adhesive sheet same as described in Example 1 but not subjected to the treatment with the fluorine gas/oxygen gas mixture. The obtained bonded test pieces are used for tensile shearing test. The results are shown in Table 1.

Comparative Example 2

A polypropylene sheet same as described in Example 1 was coated with a primer for polypropylene and dried at room temperature. Then an acrylic adhesive Loctite 401 (mfd. by Japan Loctite Corporation) was dropped onto the primer coated surface of the polypropylene sheet, and immediately thereafter this sheet was brought into contact with the primer applied surface of an adherend sheet, and the sheets were pressurized to bond thereof. The obtained bonded test pieces were used for tensile shearing test and electrolysis solution-immersion test. The results are shown in Table 1.

Comparative Example 3

The same procedure as defined in Example 1 was conducted except that as the adhesive sheet a sheet composed of a commercial epoxy adhesive (trade name: Araldite, mfd. by CIBA GEIGY Co., Ltd.) was used, to obtain the bonded test pieces. The obtained bonded test pieces were used for tensile shearing test and electrolysis solution-immersion test. The results are also shown in Table 1.

Further, a battery is prepared by using the above obtained samples. The dropping test for the battery case is conducted and the bonding portion is broken down.

TABLE 1

| | Tensile shearing test | | |
|---|---|---|---|
| | Maximum tensile shearing load/(kgf) | Elongation percentage (%) | Electrolysis solution-immersion test |
| Example 1 | 185 | 17 | no problem |

TABLE 1-continued

| | Tensile shearing test | | |
|---|---|---|---|
| | Maximum tensile shearing load/(kgf) | Elongation percentage (%) | Electrolysis solution-immersion test |
| Example 2 | 124 | 15 | no problem |
| Comp. Example 1 | 45 | 2 | (not examined) |
| Comp. Example 2 | 194 | 2 | The adhesive was eluted. |
| Comp. Example 3 | 286 | 3 | no problem |

What is claimed is:

1. Battery parts comprising molded pieces made of polyolefin resin, whose surface to be bonded are treated so as to have at least one functional group selected from the group consisting of hydroxyl group, carboxyl group, carbonyl group, fluorosulfuryl group, sulfonic group and its metallic bases, said molded pieces being bonded together with reactive hot-melt adhesive.

2. Battery parts according to claim 1, wherein at least hydroxyl group, carboxyl group, carbonyl group, fluorosulfuryl group, is introduced by a surface treatment of the moldings with a gas containing fluorine gas.

3. Battery parts according to claim 2, wherein the gas containing fluorine gas is a mixed gas comprising fluorine gas and oxygen gas.

4. Battery parts according to claim 3, wherein the ratio of oxygen gas to fluorine gas is 0.01–1,000:1 in terms of partial pressure.

5. Battery parts according to claim 2, wherein the gas containing fluorine gas is a mixed gas comprising fluorine gas and sulfur dioxide gas.

6. Battery parts according to claim 5, wherein the gas containing fluorine gas comprises 0.01 to 30 vol % of fluorine gas, 0.1 to 90 vol % of sulfur dioxide gas and 0 to 95 vol % of oxygen gas.

7. Battery parts according to claim 1, wherein the metal salt of sulfonic group is introduced by treating the surface to be bonded of moldings with the gas containing fluorine gas comprising fluorine gas and sulfur dioxide gas, and then immersing them in an alkaline solution containing an alkaline metal or an alkaline earth metal.

8. Battery parts according to claim 1, wherein the sulfonic group is introduced by treating the surface to be bonded of moldings with the gas containing fluorine gas comprising fluorine gas and sulfur dioxide gas, immersing them in an alkaline solution containing an alkaline metal or an alkaline earth metal, and then further immersing them in sulfuric acid.

9. Battery parts according to claim 1, wherein the functional group is at least selected from the group consisting of hydroxyl group, carboxyl group and carbonyl group.

10. Battery parts according to claim 1, wherein the reactive hot-melt adhesive is a polyolefin-based adhesive.

11. Battery parts according to claim 1, wherein the battery is a lithium battery.

12. Battery parts comprising molded pieces made of polyolefin resin whose surface to be bonded is treated with gas containing fluorine gas, said molded pieces being bonded together with reactive hot-melt adhesive.

13. Battery parts according to claim 12, wherein the reactive hot-melt adhesive is polyolefin-based adhesive.

14. Battery parts according to claim 1, wherein the polyolefin-based adhesive is a reactive hot-melt adhesive comprising as a mainly reactive component a prepolymer obtained by reacting a compound (a) in which the reactive groups are separated by carbon chains having 12 or more carbon atoms on the average, with a compound (b) reactable therewith, the percentage of the compound (a) being not less than 50 wt % based on the weight of the whole adhesive composition.

15. Battery parts according to claim 13, wherein the polyolefin-based adhesive is a reactive hot-melt adhesive comprising as a mainly reactive component an isocyanate-terminated prepolymer obtained by reacting the compound (c) having active hydrogens bonding to the hydrocarbon skeleton of polyolefin with an excess amount of polyisocyanate compound (d), the content of active hydrogen in the compound (c) being 0.01 to 3 milliequivalent/g.

16. Battery parts according to claim 15, wherein the active hydrogen group is derived from a functional group of hydroxyl group, carboxyl group or amine.

17. Battery parts according to claim 1, wherein the polyolefin-based adhesive is as a mainly reactive component an isocyanate-terminated prepolymer obtained by reacting a compound (c) having active hydrogens with an excess amount of polyisocyanate compound (d), said compound (c) comprising a polymer of conjugate diene monomer or a copolymer of said diene monomer and olefin monomer, said polymer being a polyol and having at least one hydroxyl group in the molecule, and at least part of the double bonds of said polyol being hydrogenated.

18. Battery parts according to claim 1, wherein the polyolefin-based adhesive is as a mainly reactive component an isocyanate-terminated prepolymer obtained by reacting a hydrogenation product of polybutadiene and a polyisocyanate compound, said hydrogenation product having a number-average molecular weight of 500 to 20,000, an iodine value of not more than 100 and not less than 1 hydroxyl group(s) on the average per one molecule.

19. Battery parts according to claim 18, wherein the hydrogenation product of polybutadiene is a mixture comprising 95 to 20 wt % of a polymer having hydroxyl group(s) of not less than 1 and less than 2 on the average per one molecule and 5 to 80 wt % of a polymer having hydroxyl groups of not less than 2 and not more than 8 on the average per one molecule.

20. A process for producing battery parts comprising molded pieces made of polyolefin resin, which process comprises introducing at least one functional group selected from the group consisting of hydroxyl group, carboxyl group, carbonyl group, fluorosulfuryl group, sulfonic group and its metallic bases into the resin constituting the surface to be bonded, and bonding said molded pieces together with polyolefin-based reactive hot-melt adhesive.

21. A process for producing battery parts comprising molded pieces made of polyolefin resin, which process comprises treating the bonding surface of said molded pieces with gas containing fluorine gas, and bonding said molded pieces together with polyolefin-based reactive hot-melt adhesive.

* * * * *